US006965801B2

(12) United States Patent
Hall

(10) Patent No.: US 6,965,801 B2
(45) Date of Patent: Nov. 15, 2005

(54) METHOD AND SYSTEM FOR CONTROLLING ONE OR MORE APPARATUS BASED ON A GEOGRAPHIC LOCATION

(76) Inventor: Christopher R. Hall, 2450 NW. 53rd St., Boca Raton, FL (US) 33496

( * ) Notice: Subject to any disclaimer, the term of this patent is extended or adjusted under 35 U.S.C. 154(b) by 548 days.

(21) Appl. No.: 10/212,307

(22) Filed: Aug. 5, 2002

(65) Prior Publication Data

US 2003/0025400 A1 Feb. 6, 2003

Related U.S. Application Data

(60) Provisional application No. 60/310,388, filed on Aug. 6, 2001.

(51) Int. Cl.$^7$ .............................................. G05B 19/18

(52) U.S. Cl. ........................... 700/66; 700/64; 700/65; 700/13; 700/14; 700/16; 700/19; 701/2; 701/200; 701/213; 701/214; 368/14; 368/16; 368/28; 368/42; 368/225

(58) Field of Search ............................ 700/11–16, 19, 700/20, 65, 66, 64; 701/2, 23, 26, 200, 213–214, 701/300; 368/14, 16, 21, 28, 42, 225; 340/505, 340/506, 310.06, 825.06

(56) References Cited

U.S. PATENT DOCUMENTS 4,354,120 A 10/1982 Schornack
4,360,739 A 11/1982 Goldstein
4,415,785 A 11/1983 Uno et al.
4,669,891 A * 6/1987 Rosevear ..................... 368/21
5,140,419 A * 8/1992 Galumbeck et al. ........ 348/465
5,160,853 A 11/1992 Simon et al.
5,258,656 A 11/1993 Pawlick
5,397,930 A 3/1995 Nilssen
5,521,887 A * 5/1996 Loomis ....................... 368/47
5,586,048 A 12/1996 Coveley
5,898,384 A * 4/1999 Alt et al. ............... 340/825.36
5,930,501 A * 7/1999 Neil ........................... 713/400
5,948,040 A * 9/1999 DeLorme et al. ........... 701/201
5,955,796 A 9/1999 Nilssen
6,011,755 A * 1/2000 Mulhall et al. ............... 368/10
6,268,826 B1 7/2001 Schmidt et al.
6,310,547 B1 * 10/2001 Parker ........................ 340/540
2001/0014832 A1 * 8/2001 Hatemata et al. ............. 700/16

OTHER PUBLICATIONS

Philips Semiconductors, Integrated Circuits, Data Sheet, "Low power clock/calendar," PCF8593, Product Specification, Mar. 25, 1997.

(Continued)

*Primary Examiner*—Ramesh Patel
(74) *Attorney, Agent, or Firm*—Jeffrey Giunta; Jon A. Gibbons; Fleit, Kain, Gibbons, Gutman, Bongini & Bianco P.L.

(57) ABSTRACT

A method and device that controls one or more apparatus in relation to the expected time of sunrise and sunset at the location of the apparatus. The operator enters a geographic location identifier, such as a zip code or telephone area code, and the controller computes the expected time of sunrise and sunset at the corresponding geographic location. The controller is configured to translate the entered geographic location code into the offset times, based upon the latitude and longitude of the location. The controller is able to either directly retrieve stored time offsets or it retrieves the latitude and longitude that corresponds to the entered geographic location code and determines the time offset from that latitude and longitude.

24 Claims, 5 Drawing Sheets

OTHER PUBLICATIONS

Eggers, Torsten; Ham, Nick; "Philips 51LPC-Microcontrollers & Triacs Easily Connected," AN467_1, Philips Semiconductors, Integrated Circuits, Application Note, Dec. 6, 2000, pp. 1-14.
Zeus Home Automation Feature List, pp. 1-8.
Paragon EC365DST Data Sheet.
Know-Where Web Site, p. 1.
Old Farmer's Almanac Web Site, pp. 1-2.
Geoscience Australia Web Site, pp. 1-3.
Geographic Web Site, p. 1.
Ziplnfo Web Site, pp. 1-5.
Sun Creations Web Site, 6 pgs.
Sun Tracker Data Sheet.
Sun Tracker Description.

* cited by examiner

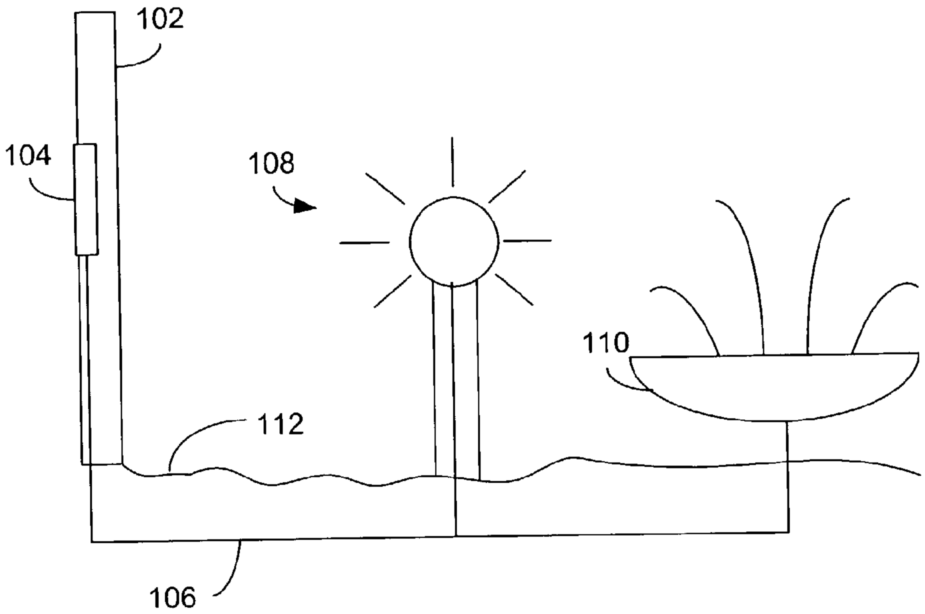
FIG. 1
FIG. 2A
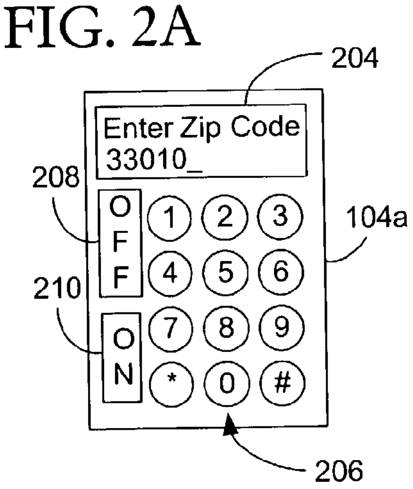
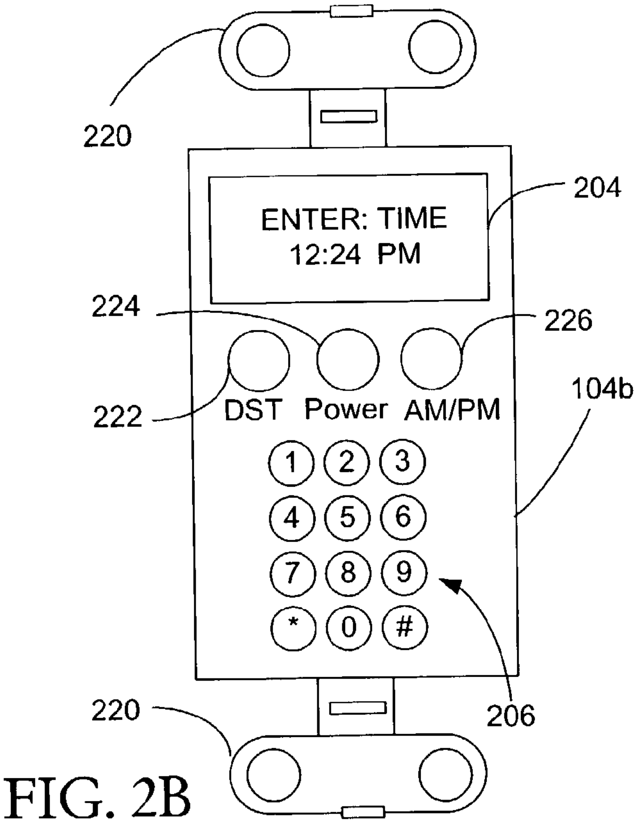
FIG. 2B

METHOD AND SYSTEM FOR CONTROLLING ONE OR MORE APPARATUS BASED ON A GEOGRAPHIC LOCATION

CROSS REFERENCE TO RELATED APPLICATIONS

This application claims priority from U.S. Provision Application No. 60/310,388, filed Aug. 6, 2001, the disclosure of which is hereby incorporated by reference in its entirety.

BACKGROUND OF THE INVENTION

1. Field of the Invention

This invention generally relates to the field of apparatus control systems and more specifically to the field of time based apparatus control systems.

2. Description of the Related Art

Automatic control of devices, especially household electrical devices, such as lights, fountains, irrigation systems and swimming pool pumps, frequently requires that the devices be activated or deactivated at times relative to the time of the sunrise and sunset at the location of the device. The time of sunrise and sunset at a particular location, however, is not constant throughout the year at points on the earth that are removed from the equator. Sunrise and sunset times vary throughout the year as a function of the latitude of the location. The nominal time of day of sunrise and sunset is also a function of the longitude of the location within the time zone of the location. The time of sunrise and sunset at a given location can be accurately calculated based upon the latitude and longitude of the location, but determination of a location's latitude and longitude are at least inconvenient and often beyond the desired effort of people who are responsible for the control of these devices. Devices that are automatically controlled to operate at times relative to sunrise and sunset typically have a manually set time of day clock and manually set "on" and "off" times. The person responsible for the control of the device is required to manually adjust the "start" and "stop" times for the device as the sunrise and sunset times vary throughout the year. This manual adjustment is inconvenient and can lead to waste and energy inefficiency if the manual adjustments are not made. This manual adjustment is frequently performed only occasionally and is sometimes forgotten, thereby resulting in deviations of the start and stop time for the devices that vary from the desired times relative to sunrise and sunset.

Some electrical device controllers control estimate sunrise and sunset based upon a specification of a geographic region or district of a country. Small countries such as Japan have small geographic regions such, as districts, that are smaller than common US geographic regions, such as states. These countries can use a specification of geographic region to estimate sunrise and sunset times. These districts have small deviations between the estimated and actual time of sunrise and sunset within the district, but larger regions have larger differences that are not acceptable for timing operations in relation to sunrise and sunset, such as turning lights on and off.

SUMMARY OF THE INVENTION

Briefly, according to the present invention, an apparatus controller provides a method for controlling an apparatus that includes accepting a geographical location identifier that is associated with a specific geographical location of the apparatus and is not a latitude and longitude specification. The method then determines at least one of a sunrise time and a sunset time based upon the specific geographical location. The method then controls the apparatus at a time dependent upon the at least one of a sunrise time and a sunset time. Geographical location identifiers used by the present invention include postal zip codes and telephone area codes.

According to another aspect of the present invention, an apparatus controller provides a controller for controlling an apparatus that has a geographical location acceptor that accepts a geographical location identifier that is associated with a specific geographical location that is not a specification of latitude and longitude. The controller also has a daylight determinator that determines at least one of a sunrise time and a sunset time based upon the specific geographical location. The controller also has an apparatus controller for controlling an apparatus in response to the determination.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 1 is an operational environment diagram illustrating the configuration and arrangement of apparatus that are controlled by a controller according to an exemplary embodiment of the present invention;

FIGS. 2A and 2B are front views of two types of apparatus controllers according to exemplary embodiments of the present invention;

DETAILED DESCRIPTION OF AN EMBODIMENT

Figure 3:
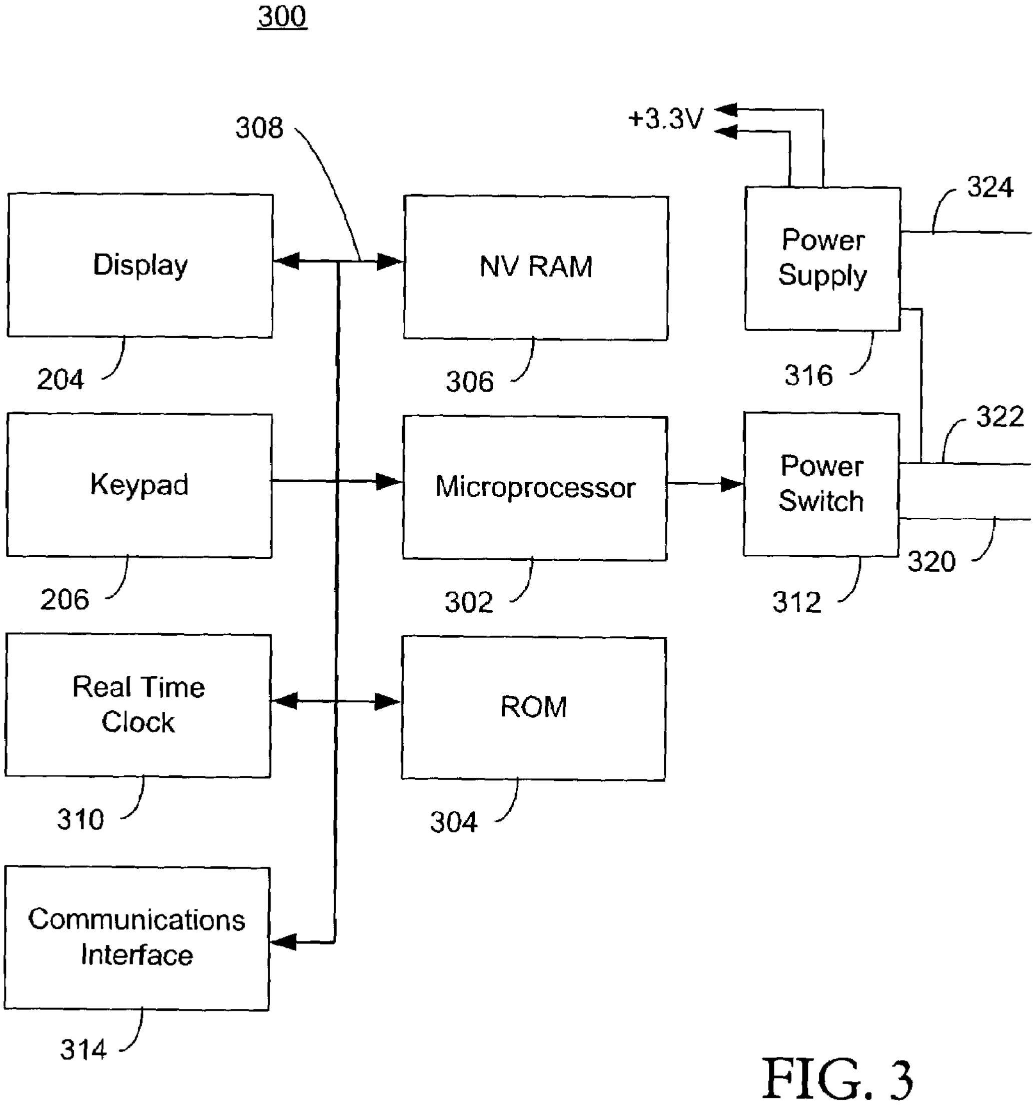
FIG. 3 is a block diagram of a controller processing circuit according to an exemplary embodiment of the present invention.

An operational environment 100 of the exemplary embodiments of the present invention is illustrated in FIG. 1. The operational environment 100 includes two devices that are controlled by exemplary embodiments of the present invention. The devices that are controlled in this operational environment 100 include electrical apparatus such as an exterior lamp 108 and a fountain 110. These devices are located outdoors and above the ground 112. Other devices that are able to be controlled include exterior low voltage lighting, interior plug-in lamps, pool or spa pumps and lights, waterfalls, irrigation, green house lighting, general signage, store signage, billboard lighting, parking lot lighting, enablement of gate operations, and animal feeders. These devices are electrical devices that receive electrical power via power line 106. Controller 104 is an apparatus controller that is an exemplary embodiment of the present invention and controls AC power that is delivered to the power line 106. The controller 104 of the exemplary embodiment is contained within a module that is mounted within a wall 102 in a conventional electrical box. The controller 104 is able to control a one or a number of different apparatus, including any devices that are located near the controller 104, such as within the same building. The controller 104 of the exemplary embodiments of the present invention control the power to apparatus by turning the power on and off at various times. The controller 104 operates to determine the expected time of sunrise and sunset at the location of the apparatus. The controller 104 of the exemplary embodiments accept a geographic location identifier, such as a postal zone code or other identification, to adjust the expected time of sunrise and sunset for the latitude and longitude of the location of the apparatus being controlled.

Two exemplary controllers 104, basic controller 104*a* and enhanced controller 104*b*, are illustrated in FIG. 2. The basic controller 104*a* has an alphanumeric display 204, a three-by-four key keypad 206, an off key 208 and an on key 210. The keypad 206 is used to enter the geographic location code used by the exemplary embodiment. The display 204 of the basic controller 104*a* is shown to prompt the user for a zip code. That particular embodiment uses the zip code for the location where the devices to be controlled as a geographic location code. A portion of the zip code or the entire zip code is able to be entered. Alternative embodiments use one or more of telephone area codes, the location's complete or partial telephone number or other geographical location data. The off switch 208 and on switch 210 of the basic controller 104*a* are used to override the automatic controller and to directly turn the apparatus on or off.

The construction of the enhanced controller 104*b* of the exemplary embodiment is able to be mounted in a conventional electrical box. This allows the controller 104*b* to replace a conventional electrical switch that is used to control the apparatus to be controlled. The enhanced switch 104*b* includes mounting tabs 220 that allow physically securing the controller to the electrical box. The enhanced controller 104*b* has a three-by-four key keypad 206 and a display 204 that are similar to the basic keypad 104*a*. The enhanced controller 104*b* additionally includes a set of indicators as follows. A Daylight Savings Time (DST) indicator 222 illuminates when daylight savings time is determined to be in effect. A power indicator 224 indicates when power is applied to the apparatus being controlled, and therefore the power is on to that apparatus. An AM/PM indicator 226 illuminates to indicate if the displayed time is AM or PM.

A component block diagram of the controller circuit 300 of an exemplary embodiment of the present invention is illustrated in FIG. 3. Exemplary embodiments of the present invention utilize logic circuits that operate at a nominal power supply voltage of 2.8 Volts in order to facilitate operation under battery power. The block diagram 300 has a microprocessor 302 that performs the processing required by the controller 104. The controller circuit 300 has a power input that conveys that consists of the AC power in line 322 and the AC power neutral line 324. The AC power in line 322 carries AC line voltage that drives the power supply 316 and that is routed through the power switch 312. The power supply 316 converts the AC line voltage to the one or more DC voltages used by the logic components of the controller circuit 300. The power supply 316 of the exemplary embodiment further contains a battery to provide DC voltages to the logic circuitry of the controller circuit 300 when the AC line power is not available. Exemplary embodiments of the present invention utilize a 3.3 Volt Lithium battery to facilitate powering the 2.8 Volt logic circuits. The power switch 312 controls the connection between the AC power in line 322 and the switched output 320. The switched output 320 delivers, via power line 106, AC line power to the apparatus being controlled. The power switch 312 of the exemplary embodiment is a semiconductor TRIAC that is controlled via the microprocessor 302. Alternative embodiments of the present invention utilize mechanical relays or other semiconductor switches to control the power to the apparatus being controlled. The use of a mechanical relay as power switch 312 facilitates the use of the controller 104 with florescent lights or electro-mechanical devices such as motors or relays. Embodiments of the present invention use TRIAC pairs or double throw mechanical relays to control "three wire" switches that allow a load to be controlled by any one of two switches that are properly interconnected.

The processing of the controller circuit 300 is primarily performed in the exemplary embodiment by the microprocessor 302. The microprocessor 302 of the exemplary embodiment is an 80C51 compatible microcontroller that is designed for low power consumption to allow operation from battery power when the AC power is off due to a power outage or for other reasons. The exemplary embodiment of the present invention specifically utilizes an 87LPC762 microcontroller available from Philips Semiconductors of Eindhoven, The Netherlands. The 87LPC762 microcontroller includes ROM and RAM to contain the program instructions and temporary data used by the operating program of the microprocessor 302.

The microprocessor 302 of the exemplary embodiment utilizes a data bus 308 to allow electrical communications between the microprocessor 302 and selected devices contained within the controller circuit 300. The data bus 308 of the exemplary embodiments includes an inter-integrated circuit (12C) bus interface. The 12C bus interface is a two line, multi-device serial data interface that allows multiple devices to be in electrical communication with the microprocessor. The data bus 308 of the exemplary embodiment further contains parallel control lines that use digital logic to perform control and communications with devices connected to the microprocessor 302. The data bus 308 of the exemplary embodiment includes digital logic circuits in order to implement proper interfaces with some circuitry. The exemplary embodiment of the present invention utilizes LV logic family circuits in order to allow operation at low voltage and minimize power consumption.

The controller circuit 300 of the exemplary embodiments of the present invention includes a real time clock 310 to maintain the time of day and day of year. The time of day and day of year is used to determine the expected time of sunrise and sunset for the specified geographic location. The real time clock 310 of the exemplary embodiment is initially set with the local time and date by an operator and the real time clock 310 maintains the current time and date thereafter. The real time clock 310 operates via a battery contained within the power supply 316 when the AC power is not available. The exemplary embodiment of the present invention utilizes the PCF8593 lower power clock/calendar integrated circuit produce by Philips Semiconductors. The PCF8593 includes an 12C interface to facilitate interconnection with the microprocessor 302.

The controller circuit 300 of the exemplary embodiments contains a display 204 and keypad 206 to allow operator input and display of prompts, data and operating status to the operator. The display 204 of the exemplary embodiment is able to display two lines of alphanumeric data. Display 204 of embodiments of the present invention incorporate fixed graphical indicators along the bottom edge of the display to augment or replace the discrete indicators illustrated above, such as the Daylight Saving Time (DST) indicator 222, power indicator 224 and AM/PM indicator 226. Embodiments of the present invention use displays 204 that support graphical displays.

The exemplary controller circuit 300 includes Non-Volatile Random Access Memory (NVRAM) 306 to store data used by the operation of the controller circuit 300. The NVRAM 306 of the exemplary embodiment is used to store the geographic locator used by the particular embodiment, such as the zip code used by the exemplary embodiment. The NVRAM 306 is also used in embodiments to store other operational data that is to be retained, including date ranges for daylight savings time and other information. Exemplary embodiments of the present invention utilize an 12C serial EEPROM device model number S24163 from Summit microelectronics, Inc., of Campbell, Calif.

The exemplary controller circuit 300 includes a Read Only Memory (ROM) 304 to store non-changing data used by the embodiments of the present invention. The ROM 304 of the exemplary embodiments stores a translation between the geographic location identifier used by the embodiment and the corresponding data used by the processing of that embodiment to determine sunrise and sunset times. The ROM 304 of the exemplary embodiment is able to store, for example, the latitude and longitude that correspond to each zip code in the United States.

Figure 7:
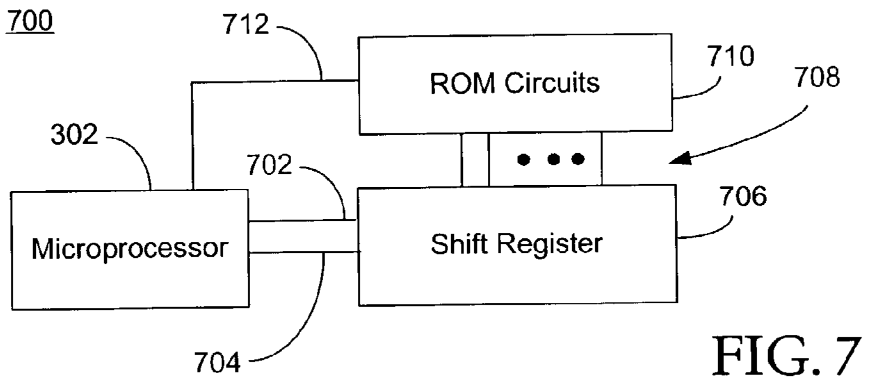
FIG. 7 is a schematic diagram of a ROM interface circuit according to an exemplary embodiment of the present invention.

The exemplary embodiment of the present invention stores time offsets that correspond to the zip codes in ROM 304. The exemplary embodiment utilizes the fact that the processing of the exemplary embodiment only retrieves location related data from the ROM 304 once after the geographic location identifier is entered. The ROM interface circuitry 700 of the exemplary embodiment is illustrated in FIG. 7. The ROM interface circuitry 700 stores data in a ROM and retrieves one bit of data at a time. This allows accessing the data within the ROM by using a minimum of interface pins on the microprocessor 302. Minimizing interface pins on the microprocessor 302 minimizes construction costs and power consumption of the controller 104. The ROM interface circuitry 700 of this embodiment uses two data outputs of the microprocessor 302, a data line 702 and a clock line 704, that are connected to the data input and clock input of a shift register structure 706. The shift register structure 706 of the exemplary embodiment is made up of several shift registers connected in series to produce the required number of parallel output bits 708. The number of required parallel output bits is the number of bits required to uniquely access the possible combinations of geographic location identifiers plus the number of bits required to access the number of bits used to store the data to be retrieved. The parallel data output 708 of the shift register 706 are then connected to the address inputs of the ROM circuits 710. The ROM circuits 710 of the exemplary embodiment are made up of several ROM circuits in order to obtain the required amount of storage. The data bits are then produced in a serial fashion on the output 712 of the ROM circuits 710. The ROM output 712 is then monitored by the microprocessor 302 to determine the data stored in the ROM that corresponds to the address communicated out of the data outputs.

Exemplary embodiments of the present invention accept geographic location identifiers that include postal codes, such as zip codes or portions of zip codes, or telephone number portions. Telephone number portions include some or all of country codes, area codes, city codes, exchange numbers and other parts of a telephone number. Embodiments of the present invention accept telephone number portions that are the whole telephone number or only part of the telephone number that sufficiently allows determination of the geographic location that corresponds to the telephone number in order to determine sunrise and sunset times.

Embodiments of the present invention that accept United States' zip code data as an input to determine geographic location are able to accept different size portions of zip codes to allow differing levels of location determination accuracy. Embodiments are able to accept entire five or nine digit zip codes to allow increased accuracy in geographic location specification via the zip code data or as few as the first three digits are able to be entered to support reduced but sufficient location determination accuracy with ease of use for the user. The exemplary embodiments of the present invention stores the time offset of the average sunrise and sunset at the specified location, which is related to the longitude of the location within its time zone, and a value that corresponds to the latitude of the location in order to determine the variation of the sunrise and sunset times on a particular day of the year. Embodiments of the present invention utilize techniques to reduce the data storage requirements for data items that correspond to zip codes. U.S. Pat. No. 6,268,826 describes such data storage reduction techniques to reduce the amount of data stored to determine latitude and longitude from U.S. Zip codes. Embodiments of the present invention utilize similar storage reduction techniques to store mean time offsets and annual time variations for sunrise and sunsets for ranges of zip codes. The contents and teachings of U.S. Pat. No. 6,268,826 are hereby incorporated herein by reference. The accuracy of time offsets for sunrise and sunsets in the embodiments of the present invention is not strict, and great reductions in storage are achieved by these techniques.

Embodiments of the present invention further accommodate variations in sunrise and sunset within a zip code or region based upon the topographical variations as well as upon altitude variations within the specified region. Sunrise and Sunset times vary not only by altitude, but the onset of darkness and daylight is also affected by sun blockage caused by surrounding mountains. Embodiments of the present invention account for the average altitude of the specified geographic region when estimating sunrise and sunset times. Embodiments further store an indicator with each geographic region indicator that indicates if that region has altitude variations greater than a certain value. An example is an area that has altitude variations greater than three thousand feet. If a user enters a geographic location identifier that is associated with an area that has altitude variations greater than this certain value, the user is prompted that inaccuracies may result in the estimated sunrise and sunset times used by the controller, and that the user should enter an offset time, which is stored into NVRAM 306. The area of geographic altitude variation is able to be greater than the area associated with the geographic location identifier in order to account for mountains in adjacent areas, such as in adjacent zip codes.

Exemplary embodiments of the present invention include an optional communications interface 314. Communications interface 314 of the exemplary embodiment allow communications of control messages over the commonly available X10 and CE Bus protocols used to control household and other electronic devices. Communications interfaces 314 that are used by other embodiments of the present invention are able to communicate to or otherwise affect control of an apparatus over another type of interface that is utilized by that apparatus. The communications interface 314 is able to communicate to one or more devices that are controlled by the particular embodiment of the present invention.

Figure 4:
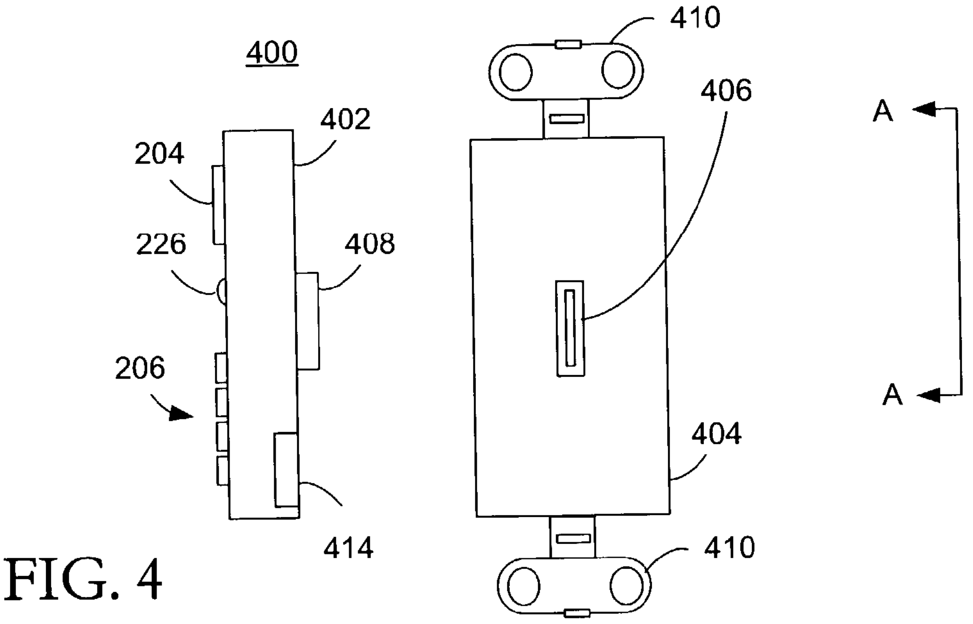
FIG. 4 is a mechanical illustration of a detachable face controller according to an exemplary embodiment of the present invention.

A detachable face controller 400 according to an embodiment of the present invention is illustrated in FIG. 4. The detachable face controller 400 is installed in an electrical box, as is the enhanced controller 104*b*, with mechanical support provided by the mounting tabs 410. The detachable face controller 400 has two separable parts, a control face 402 and a controller housing 404. The control face 402 contains the display 204, keypad 206 and indicator lights, such as the AM/PM indicator 226, as are contained in the enhanced controller 104*b*. The control face 402 is detachable from the main controller housing 404 and is connected to the controller housing 404 via a face connector 408. The main controller housing 404 is installed within the electrical box but the control face 402 of the exemplary embodiment is mounted externally from the electrical box to facilitate removal by the user.

Alternative embodiments of the detachable face controller 400 install logic circuits and a battery 414 into the control face 402 in addition to the display 204, keypad 206 and indicator lights. The controller housing of these embodiments contain the power switch 312 and the power supply 316 except that a battery 414 is contained within the control face 402. Placing the battery 414 within control face 402 facilitates replacement of the battery 414 since the control face is removable and access to the battery 414 does not require removal of a faceplate on the electrical box in which the control housing 404 is mounted.

The face connector 408 is inserted into the controller connector 406 to provide an operator input and output for the controller 400. The controller connector 406 and face connector 408 convey data and power between the circuitry within the control face 402 and the circuitry in the controller housing 404. The size of the controller connector 406 of the exemplary embodiment is selected to allow the controller connector 406 to fit through a conventional wall switch faceplate, thereby allowing easy replacement of a conventional switch with the detachable faceplate controller 400. A single control face 402 is also able to be used with multiple controller housings 404. Keeping the control face 402 detached from the controller housing 404 prevents accidental or unauthorized reconfiguring of the controller time programming while limiting control and monitoring of the controller's operation to authorized persons that have a control face 402.

Figure 5:
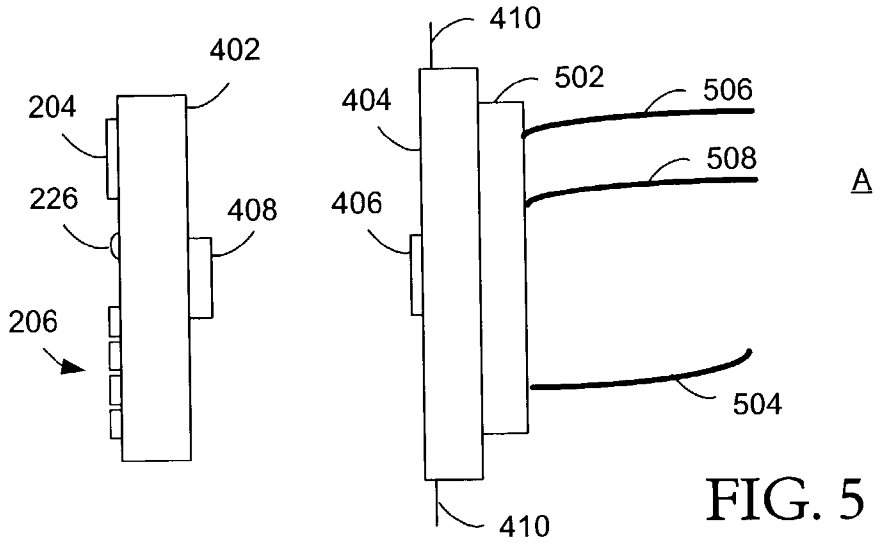
FIG. 5 is a side view of a detachable face controller according to an exemplary embodiment of the present invention.

The control face 402 contains circuitry to operate the keypad 206, display 204 and the indicator lights, such as the AM/PM indicator 226. The controller housing 404 of the exemplary embodiment includes the microprocessor 302, real time clock 310, the ROM 304, RAM, 306 power supply 316, the and communications interface 314, if one is included in the controller. The power switch 312 of the exemplary embodiment is a detachable component of the controller housing 404, as is discussed below, but is not detached from the controller housing 404 in normal operations The side view of the detachable face controller 400 is illustrated in FIG. 5. The side view illustrates the detachable power switch module 502 that is connected to the controller housing 404. This detachable power switch allows configuration of the detachable face controller 400 to use other power switch circuitry, such as solid state or mechanical relays. The power switch module 502 is also able to be configured for different line voltages. The power switch module 502 is connected to the AC power in line 506 and switched output 504, as well as the AC Power neutral line 508. Detachable power switch modules 502 are similarly able to be included in other controllers, such as the basic controller 104*a* and enhanced controller 104*b*.

Figure 6:
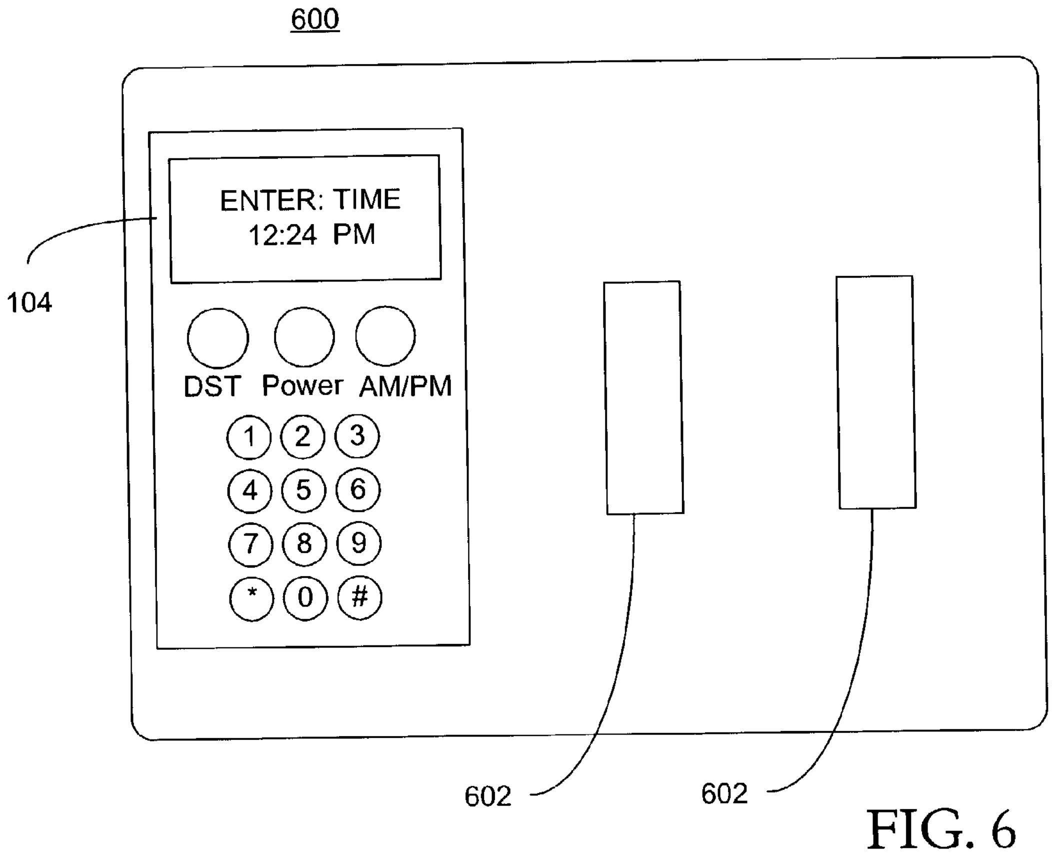
FIG. 6 is a front view of a multi-gang switch panel that includes a controller according to an exemplary embodiment of the present invention.

A multiple gang switch installation 600 is illustrated in FIG. 6. The multiple gang switch installation 600 shows a controller 104 that is installed in a three-gang switch configuration with conventional switches 602 located in the other two positions. This illustrates the facility with which the controller 104 is able to be integrated into existing switch sockets while blending well with other switch equipment. Multiple controllers 104 are also able to be mounted into a multiple gang switch installation.

Figure 8:
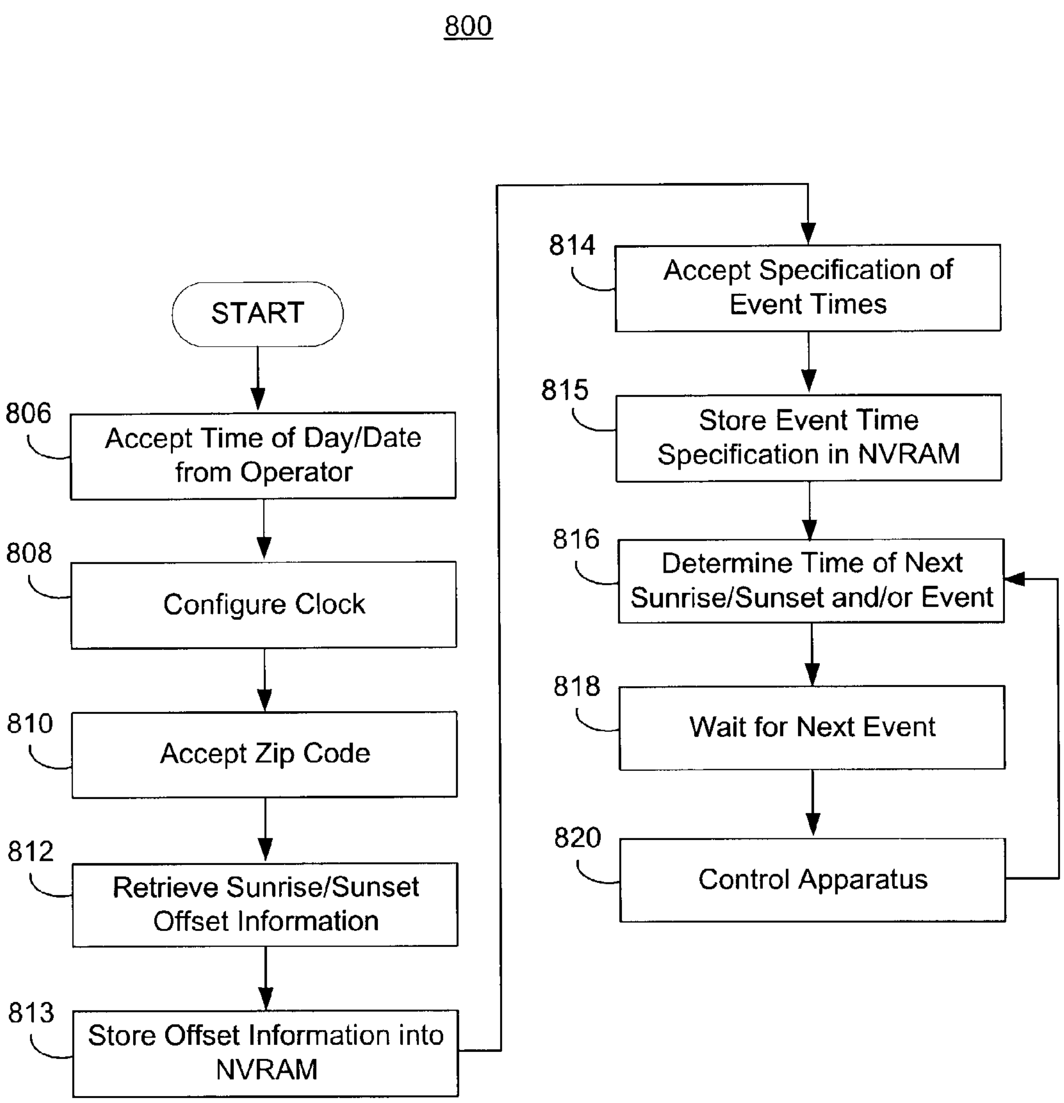
FIG. 8 is a processing flow diagram of an apparatus controller according to an exemplary embodiment of the present invention.

The control processing 800 that is performed by the exemplary embodiments of the present invention is illustrated in FIG. 8. The processing of the exemplary embodiment begins by accepting, at step 806, the current time of day and the current date at the location of the apparatus being controlled. Embodiments of the present invention accept a specification that Daylight Savings Time (DST) is in effect for the time specified. The operator enters this data in the exemplary embodiment via a geographic location acceptor that includes the keypad 206. The operator enters data in response to prompts and data presented on the display 204. The processing then configures, at step 808, the real time clock 310 with the entered time and date. Once the real time clock 310 is configured, the exemplary embodiment then accepts from the operator, at step 810, the zip code of the location of the apparatus to be controlled. The zip code in the exemplary embodiment is entered via the keypad 206 in response to prompts and data presented on the display 204. Once the zip code is entered, the offset information used by the algorithm of the embodiment to determine the time of sunrise and sunset are retrieved, at step 812, from the ROM 304. The exemplary embodiment utilizes time offsets as are described above as input into the sunrise/sunset algorithm. The processing then stores this information, at step 814, into the NVRAM 306 for easier retrieval by the microprocessor 302 during operations.

The processing then accepts from the operator, at step 814, a specification of the time of control events. The exemplary embodiment of the present invention accepts specifications of time when the apparatus being controlled is to be turned on or off relative to the time of sunrise or sunset during that day. An example is the turning on of a light ten minutes after sunset and turning off the light ten minutes before sunrise. The exemplary embodiment of the present invention accepts multiple specifications of these event times. Exemplary embodiments of the present invention allow power turn-on and turn-off time to be specified in one of three formats: 1) time relative to sunrise; 2) time relative to sunset; and 3) absolute time. The times relative to sunrise and sunset are able to be at the time of sunset or a specified number of minutes before or after sunrise or sunset. Examples of time of control events are turn-on ten minutes after sunset and turn-off at eleven PM or turn-on at four AM and turn-off ten minutes after sunrise.

As the event times are accepted from the operator, these specifications are stored, at step 815, into NVRAM 306. The exemplary embodiments accept the specification of the time of control events via the keypad 206. Specification of the time of control events is also able to be accepted via the communications interface 314.

After storing the event times into NVRAM 306, the processing then enters a loop to control the apparatus. The processing determines, at step 816, the time of the next sunrise or sunset based upon the day of the year. A daylight determinator, which includes the real time clock 310 and software operating within the microprocessor 302, calculates this time. The daylight determinator further applies daylight savings time adjustments based upon the date provided by the real time clock 310 and programming within the microprocessor 302. The exemplary embodiments also calculate the time of the next control event. After the next control event is calculated, the processing then waits, at step 818, for the time of the next control event as determined by the real time clock 310. During this waiting step, the processing of the exemplary embodiment continues to accept operator input and to display status of the controller. When the time of the next event arrives, the apparatus is controlled, at step 820, by activating the apparatus controller to turn the power to the device on or off as required. The apparatus controller of the exemplary embodiment includes the power switch 312 and software operating within the microprocessor 302. Control of the apparatus is also able to be effected by communications interface 314, which transmits command to a controllable device over an interface such as X10 or the CE interface. After the apparatus is controlled, the processing then returns to determine, at step 816, the time of the next sunrise or sunset and the time of the next event based thereon.

In addition to the devices illustrated above, embodiments of the present invention are able to similarly control other apparatus, such as pumps used for irrigation, swimming pools or other uses, and other devices. Alternative embodiments of the present invention are similarly able to operate by direct mechanical control of an apparatus or by other mechanisms as an alternative to the electrical power switching control mechanism illustrated above.

Embodiments of the present invention are also able to be contained in self contained housings. Variations of these designs have housings that are able to be directly plugged into a wall AC power socket and have an integral power outlet to which devices to be controlled are able to be connected. Other housings have a cord that is plugged into a wall AC power socket and the housing sits on the floor or other surface.

Alternative embodiments of the present invention are contained within a module that is plugged into a power outlet and which, in turn, allow the power input of an apparatus to be connected to that module. These embodiments contain a larger battery within the power supply 316 to accommodate programming while the device is not connected to AC power.

It is important to note, that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Although a specific embodiment of the invention has been disclosed. It will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for controlling an apparatus, the method comprising the steps of:

accepting, at an apparatus controller, a geographical location identifier, wherein the geographical location identifier is associated with a specific geographical location, wherein the geographic location identifier comprises a zip code portion;

determining, at the apparatus controller, at least one of a sunrise time and a sunset time based upon the zip code portion; and controlling an apparatus at a time dependent upon the at least one of a sunrise time and a sunset time.

2. The method according to claim 1, wherein the step of determining comprises the step of adjusting at least one of the sunrise time and the sunset time for an altitude associated with the geographical location identifier.

3. The method according to claim 1 further comprising the steps of:

providing first electrical connector to a housing containing the apparatus controller;

providing a second electrical connector to a detachable input device for accepting the geographic location identifier, the second connector attachable to the first electrical connector and physically configured to fit through a conventional wall switch faceplate;

locating the housing behind the conventional wall switch faceplate so as to align the first electrical connector with a slot in the conventional wall switch faceplate; and connecting the second electrical connector to the first electrical connector by inserting the second electrical connector through the slot of the conventional wall switch faceplate and into the first electrical connector.

4. The method according to claim 1, wherein the step of controlling comprises the step of communicating a control message over an electronic control interface.

5. The method according to claim 1, wherein the determining further determines that altitude variations within an area associated with the geographical location identifier exceeds a certain value; and further comprising the step of:

applying, in response to determining that altitude variations within an area associated with the geographical location identifier exceed a certain value, a user for a time offset value to be applied to at least one of the sunrise time and the sunset time.

6. The method according to claim 5, further comprising the step of accepting the time offset value.

7. The method according to claim 1, further comprising the step of storing the geographic location identifier in non-volatile memory.

8. An apparatus controller, comprising:

a geographical location acceptor, wherein the geographical location acceptor accepts a geographical location identifier that is associated with a specific geographical location, wherein the geographic location identifier comprises a zip code portion;

a daylight determinator for making a determination of at least one of a sunrise time and a sunset time based upon the zip code portion and an apparatus controller for controlling an apparatus in response to the determination.

9. A controller according to claim 8, wherein the geographical location acceptor comprises a keypad and a scrolling LCD display.

10. The controller according to claim 9, wherein the keypad and the scrolling LCD display are contained in a housing that is mountable in place of a conventional wall switch.

11. A controller according to claim 8, wherein the geographical location acceptor is contained within a detachable part, the detachable part being able to be physically connected to a housing containing the daylight determinator.

12. The controller according to claim 11, further comprising:

a first electrical connector electrically coupled to the apparatus controller; and a second connector coupled to the detachable part.

13. A controller according to claim 8, wherein the daylight determinator comprises a look up table containing data used in making the determination, wherein the data relates to specific values of the geographical location identifier.

14. The controller according to claim 8, wherein the daylight determinator further:

determines if altitude variations within an area associated with the geographical location identifier exceed a certain value; and applies, in response to determining that altitude variations within an area associated with the geographical location identifier exceed a certain value, a user for a time offset value to be applied to at least one of the sunrise time and the sunset time.

15. A controller according to claim 8, wherein the daylight determinator further determines a daylight savings time adjustment to the time of day.

16. A controller according to claim 8, further comprising a communications interface for communicating commands to remote devices.

17. A controller according to claim 16, wherein the communications interface implements one of an X10 protocol and a CE protocol.

18. An apparatus controller, comprising:

memory for storing a geographic location identifier;

a plurality of input switch keys for accepting, from a user, the geographic location identifier that is associated with a specific geographical location, wherein the geographic location identifier comprises a zip code portion;

a controller, coupled to the memory to retrieve the geographic location identifier, that determines at least one of a sunrise time and a sunset time based upon the specific geographical location and for operating a power switch at specified times in relation to at least one of the sunrise time and the sunset time; and a controller housing that houses at least the memory and the controller, the controller housing comprising:

an enclosure that is mountable in place of a conventional wall-mounted electrical switch; and mounting tabs configured to support mounting of the controller housing in place of a conventional wall-mounted electrical switch.

19. The controller of claim 18, wherein the controller housing further contains the power switch, and wherein the controller housing further comprises a first electrical connector positioned so as to align the first electrical connector with a slot in a conventional wall switch faceplate attached to a wall mounted electrical box when the controller housing is mounted within the wall mounted electrical box; and the apparatus controller further comprising:

a control face, detached from the controller housing, for containing a real time clock, the memory, the input means, the controller and a battery, the control face comprising a second electrical connector attachable to the first electrical connector and physically configured to fit through the slot of the conventional wall switch faceplate.

20. The controller of claim 18, wherein the controller housing further contains the power switch and a control face for containing the plurality of input switch keys.

21. The apparatus controller according to claim 18, the apparatus controller further comprising a detachable power switch module, the detachable power switch module comprising the power switch.

22. The apparatus controller according to claim 18, the apparatus controller further comprising a detachable power switch module, the detachable power switch module comprising the power switch and a power supply.

23. An apparatus controller, comprising:

memory that stores at least a zip code portion;

a controller that determines at least one of a sunrise time and a sunset time based upon the zip code portion and for operating the power switch at specified times in relation to at least one of the sunrise time and the sunset time; and a controller housing that houses at least the memory and the controller, the controller housing comprising:

an enclosure that is mountable in place of a conventional wall-mounted electrical switch; and mounting tabs configured to support mounting of the controller housing in place of a conventional wall-mounted electrical switch.

24. The apparatus controller according to claim 23, further comprising an electrical connector electrically coupled to the controller means, the electrical connector accepting control signals comprising the zip code portion.

* * * * *